May 2, 1967 G. N. BOLINGER 3,317,893
MOTOR VEHICLE WARNING SIGNAL
Filed Sept. 18, 1963
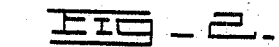
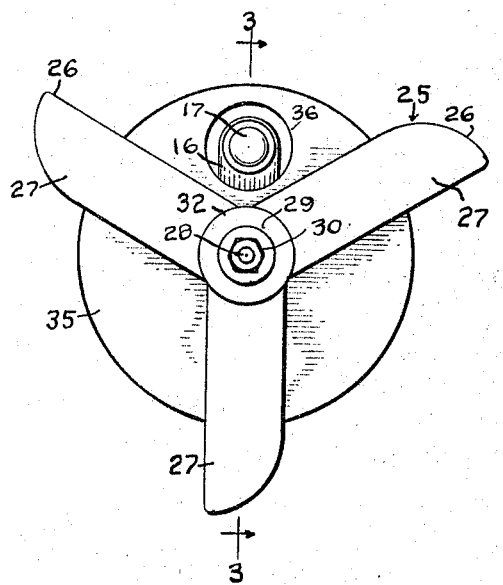
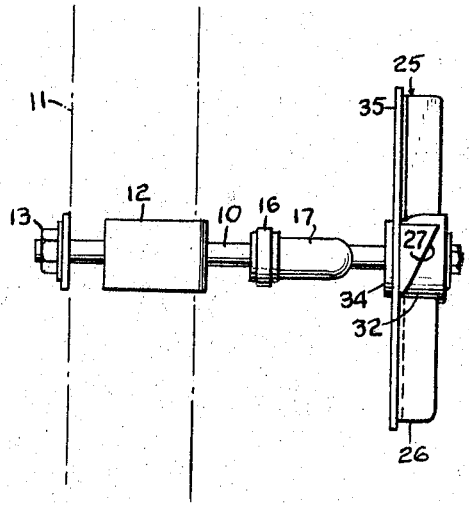
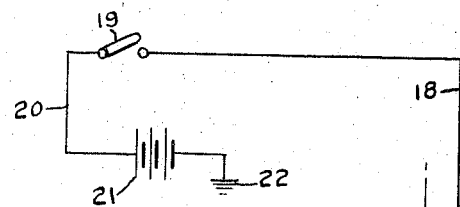
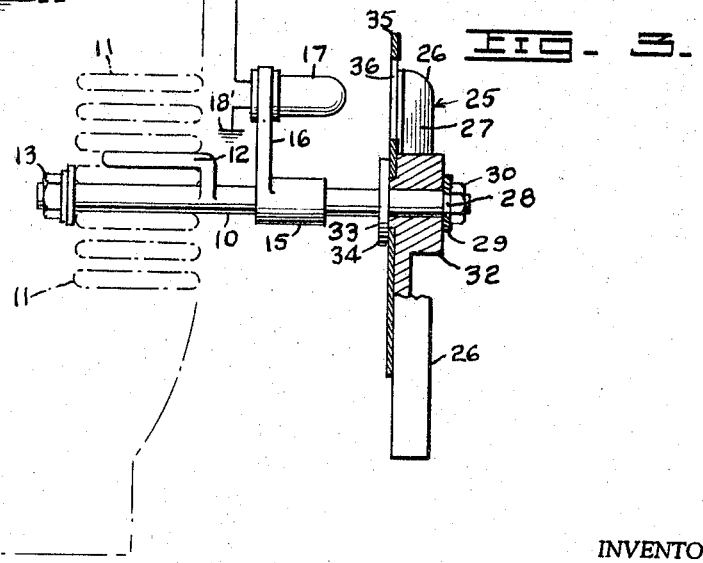
INVENTOR
GEORGE NOEL BOLINGER
BY John V. Phillips
ATTORNEY

United States Patent Office 3,317,893
Patented May 2, 1967

3,317,893
MOTOR VEHICLE WARNING SIGNAL
George Noel Bolinger, 515 N. Morgan St.,
Shelbyville, Ill. 62565
Filed Sept. 18, 1963, Ser. No. 309,817
4 Claims. (Cl. 340—96)

This invention relates to a motor vehicle warning signal, and has particular reference to a warning light preferably mounted forwardly of the grille of a motor vehicle.

When a motor vehicle driver is quite fatigued, particularly after driving long distances, he is apt to fall into a state of inattention amounting to a serious degree of lethargy which makes him a menace on the highway. Undoubtedly many head-on collisions have been caused by such condition in one of the drivers, making him wander over the center line of a highway. In an effort to assist in averting such collisions, highway authorities from time to time have requested drivers to turn on their headlights when driving on crowded highways, particularly on holidays. Such lights tend to attract the attention of oncoming drivers and rouse them from their lethargy and from a highway hypnosis which sometimes afflicts drivers after driving long distances.

With the same idea in mind, a number of automobile drivers are now mounting lights in the center of the forward end of the car, such lights being not sufficiently brilliant to be annoying to oncoming drivers, but sufficient to attract their attention. Such lights burn constantly and do not attract the attention of drivers to the extent that would occur with an intermittent light.

An important object of the present invention is to provide a novel safety light adapted to be mounted on the front end of a motor vehicle, preferably centrally of the width thereof and fixed to the grille, which flashes intermittently to attract the attention of oncoming drivers.

A further object is to provide a warning light of this type wherein a constantly burning light bulb is arranged rearwardly of a rotating element which intermittently uncovers the light to render it visible to oncoming drivers.

A further object is to provide such a device wherein the rotary member arranged forwardly of the light to uncover it intermittently is provided with propeller-like blades so that the rush of air past the vehicle, when running, effects rotation of the rotary member.

A further object is to provide such a device wherein the rotary member is provided with a body portion of greater diameter than the space between the light and the center of rotation of the rotary member and which body is cut away to expose the light source once during every revolution of the rotary member.

A further object is to provide a device of this character which is wholly self-contained as a unit and which may be quickly and readily attached to the grille of a motor vehicle.

Other objects and advantages of the invention will become apparent during the course of the following description.

In the drawing I have shown one embodiment of the invention. In this showing

FIGURE 1 is a face view of the device;

FIGURE 2 is a plan view of the same, showing means for mounting it on the motor vehicle grille, the view being taken looking radially at one of the propeller blades; and FIGURE 3 is a section on line 3—3 of FIGURE 1, parts being shown in elevation.

Referring to the drawing, the numeral 10 designates a supporting shaft for the device, the rear end of which shaft is adapted to project through the grille of a motor vehicle indicated in phantom lines by the numeral 11.

The shaft 10 is provided with an integral offset clamping element 12 broadened as shown in FIGURE 2 to overlie one of the vanes of the vehicle grille to prevent the device from rocking on the axis of the shaft 10, for a reason which will become apparent. The rear end of the shaft 10 is threaded to receive a nut 13 by means of which the shaft and clamp 12 are clamped into position relative to the grille 11.

Forwardly of the grille, the shaft 10 is provided with a collar 15 fixed thereon and having an upstanding integral arm 16, the upper end of which supports a light bulb 17, one terminal of which is grounded as at 18′. The other terminal of the bulb 17 is connected by a wire 18 to a switch 19, preferably the ignition switch of the motor vehicle, and such switch is connected by a wire 20 to the vehicle battery 21, the second terminal of which is grounded as at 22. Assuming that the switch 19 is the ignition switch, it will be apparent that whenever the motor vehicle is running the bulb 17 will be illuminated. If desired, of course, a separate switch may be arranged in the circuit so that the bulb 17 will not operate unless desired.

At the forward end of the shaft 10 is arranged a propeller indicated as a whole by the numeral 25 and shown in the present instance as having three blades 26. The propeller blades have inclined surfaces 27 whereby the rush of air past the outer ends of the blades 26 will effect rotation thereof on the forward end of the shaft 10. The forward extremity of the shaft 10 is reduced as at 28 to form a shoulder against which is arranged a washer 29 retained in position by a nut 30. The washer 29 does not bind against the propeller 25, and accordingly, the propeller 25 is free to rotate on the shaft 10.

The propeller 25 may be formed as a die casting having a hub portion 32, the rear end of which is reduced as at 33 and which engages against the collar 34 formed on the shaft 10. A body 35 is mounted on the reduced end 33 of the hub 32 and may be fixed with respect to this hub in any suitable manner, for example, by being pinned or spot-welded thereto, or the reduced hub portion 33 and the opening in the body in which it fits may be non-circular whereby the body 35 is adapted to rotate with the propeller 25.

The body 35 is shown in the present instance as being in the form of a disc, the radius of which is greater than the distance between the axis of the shaft 10 and the center of the light bulb 17. Within its periphery, the disc 35 is provided with an opening 36 substantially larger in diameter than the light bulb 17, and this bulb shows through the opening 36 once during each complete revolution of the body 35.

Operation

The entire device may be packaged and sold as an assembled unit with one terminal of the light bulb grounded on the arm 16 and with the wire 18 connected to the light bulb and adapted for connection with the ignition switch 19. To assemble the device with respect to the motor vehicle, it merely is necessary to remove the nut 13, insert the rear end of the shaft 10 through an opening in the grille 11 with the clamping arm 12 extending between two of the vanes of the grille whereupon the nut 13 is applied and tightened and the device will be fixed in position. The free end of the wire 18 is then extended past the vehicle engine and connected to the ignition switch 19.

Whenever the vehicle is moved forwardly, the rush of air past the outer ends of the propeller blades 26 will effect rotation of the propeller 25 and thus of the body 35. Once during each rotation of the body 35, the opening 36 will pass across the center of the light bulb 17, thus exposing such bulb to view forwardly of the vehicle to attract the attention of oncoming drivers. Obviously, the light bulb will be exposed intermittently, and this attracts attention far more effectively than a constantly burning light, as is now used in some sections of the country. This intermittent exposure of the light bulb has a tendency to arouse the attention of oncoming drivers, arousing them from any lethargy into which they have fallen and making them more alert. The device is thus a safety feature on a motor vehicle.

While the body 35 has been shown as a solid disc with a circular opening 36, the shape of the body 35 may be changed as desired, and the same is true of the shape and circumferential dimension of the opening 36 relative to the axis of rotation of the propeller. Moreover, two or more cut-outs or openings 36 may be provided at circumferentially spaced points, but it has been found by experimentation that the exposure of the light bulb 17 once during each rotation of the propeller is more effective than the exposure of the light bulb two or more times during such rotation. Moreover, while the propeller has been illustrated as having three blades, it will be apparent that two blades, or any greater number thereof, may be employed if desired.

The device has been found to be highly effective in operation for attracting the attention of oncoming drivers and should result in an appreciable reduction in head-on accidents on the highways.

I am aware that intermittently operated lights have been used, controlled by a rotating propeller. Such rotating elements, however, have been utilized to control switches to intermittently operate a light bulb. This constant turning off and on of the current, however, is wasteful of current and shortens the life of the light bulb. Moreover, a much greater element of friction is involved where the propeller forces are used for operating switches. In the present device, the propeller is perfectly freely rotatable and is called upon to perform no work, other than rotating the disc 35, which is freely rotatable with the propeller.

It is to be understood that the form of the invention shown and described is to be taken as a preferred example of the same, and that various changes in the shape, size and arrangement of the parts may be made as do not depart from the spirit of the invention or the scope of the appended claims.

I claim:

1. A motor vehicle warning signal comprising a shaft adapted to be fixed to the forward end of a motor vehicle and projecting horizontally therefrom, a fixed light bulb mounted eccentrically of said shaft, and a rotary unit mounted forwardly of said light bulb independently thereof and rotatable on said shaft, said unit having propelling elements to cause rotation thereof by motion of the air when the vehicle is moving forwardly, said unit being further provided with a planiform body between said bulb and said propelling elements, which body projects radially outwardly from said shaft a distance greater than the distance between the axis of said shaft and said light bulb, said body being cut away to such an extent as to intermittently substantially wholly expose said light bulb as said unit rotates.

2. A motor vehicle warning signal comprising a shaft adapted to be fixed to the forward end of a motor vehicle and projecting forwardly horizontally therefrom, a radial arm fixed to said shaft, a light bulb fixed to said arm a predetermined distance from said shaft, and a rotary unit mounted forwardly of said light bulb and rotatable on the axis of said shaft, said unit having propeller blades to effect rotation of said unit by motion of the air when the vehicle is moving forwardly, said unit being provided with a planiform body between said bulb and said propeller blades, solid portions of which body extend radially from said shaft at least said predetermined distance from the axis of said shaft throughout the greater portion of the circumference of said body, said body being cut away to such an extent as to intermittently substantially wholly expose said light bulb as said unit rotates.

3. A motor vehicle warning signal comprising a shaft adapted to be fixed to the forward end of a motor vehicle and projecting horizontally therefrom, a fixed light bulb mounted eccentrically of said shaft, and a rotary unit mounted forwardly of said light bulb and rotatable on said shaft, said unit having propeller blades to cause rotation thereof by motion of the air when the vehicle is moving forwardly, said unit being provided with a body generally in the form of a disc of greater radius than the distance between the axis of said shaft and said light bulb so as to render said light bulb invisible forwardly of the vehicle throughout most of the revolution of said unit, said disc being cut away to such an extent as to intermittently substantially wholly expose said light bulb forwardly of the vehicle as said unit rotates, said propeller blades having rear extremities lying in a plane substantially perpendicular to the axis of said shaft, said body having a forward face coincident with said plane, said blades having ends projecting radially outwardly beyond said body.

4. A motor vehicle warning signal comprising a fixed horizontal shaft adapted to project from the forward end of a motor vehicle, a radial arm fixed to said shaft, a light bulb carried by the end of said arm remote from said shaft, a propeller mounted for rotation on said shaft forwardly of said light bulb, said propeller having blades the rear extremities of which lie in a plane perpendicular to the axis of said shaft, a planiform body seating against the rear extremities of said blades with its forward face in said plane, said body being of greater lateral dimension than the distance from said shaft to said light bulb, and means fixing said body for rotation with said blades, said body having an opening at least as large as said light bulb lying between an adjacent pair of propeller blades so as to wholly expose said bulb forwardly of the vehicle as said propeller rotates and said opening passes across said light bulb, said blades having ends projecting radially outwardly beyond said body.

References Cited by the Examiner

UNITED STATES PATENTS

| | | | |
|---|---|---|---|
| 1,580,597 | 4/1926 | Grimm | 240—8.11 |
| 1,778,861 | 10/1930 | Magni | 340—96 |
| 1,839,055 | 12/1931 | Seegelken | 340—96 |
| 1,876,625 | 9/1932 | Daugherty | 340—96 |
| 1,946,916 | 2/1934 | Rizzo | 340—96 |

NEIL C. READ, *Primary Examiner.*

T. A. ROBINSON, *Assistant Examiner.*